United States Patent
Sotoyama et al.

(10) Patent No.: US 7,153,537 B2
(45) Date of Patent: Dec. 26, 2006

(54) ACIDIC DRINKS CONTAINING TOFU PUREE

(75) Inventors: Kazuyoshi Sotoyama, Kanagawa (JP);
Yusuke Miyazaki, Kanagawa (JP);
Shoji Wakao, Kanagawa (JP);
Masanori Hattori, Kanagawa (JP);
Manabu Suzuki, Kanagawa (JP)

(73) Assignee: Morinaga Milk Industry Co., Ltd., Tokyo (JP)

( * ) Notice: Subject to any disclaimer, the term of this patent is extended or adjusted under 35 U.S.C. 154(b) by 208 days.

(21) Appl. No.: 10/490,216

(22) PCT Filed: Jul. 9, 2002

(86) PCT No.: PCT/JP02/06932

§ 371 (c)(1),
(2), (4) Date: Apr. 1, 2004

(87) PCT Pub. No.: WO03/030661

PCT Pub. Date: Apr. 17, 2003

(65) Prior Publication Data

US 2005/0042352 A1    Feb. 24, 2005

(30) Foreign Application Priority Data

Oct. 2, 2001    (JP) .............................. 2001-305966

(51) Int. Cl.
*A23L 1/38* (2006.01)
(52) U.S. Cl. ...................... 426/598; 426/634
(58) Field of Classification Search ................ 426/634, 426/598

See application file for complete search history.

(56) References Cited

U.S. PATENT DOCUMENTS 6,331,324 B1    12/2001    Tomita et al.
6,641,855 B1    11/2003    Tomita et al.

FOREIGN PATENT DOCUMENTS

| EP | 988793 | 3/2000 |
|---|---|---|
| JP | 58-013358 | 1/1983 |
| JP | 58-183060 | 10/1983 |
| JP | 59-071641 | 4/1984 |
| JP | 60-256372 | 12/1985 |
| JP | 61-141840 | 6/1986 |
| JP | 02-086747 | 3/1990 |
| JP | 06-046784 | 2/1994 |
| JP | 10-313781 | 12/1998 |
| JP | 2000-093083 | 4/2000 |
| WO | 00/67593 | 11/2000 |

*Primary Examiner*—Helen Pratt
(74) *Attorney, Agent, or Firm*—Oblon, Spivak, McClelland, Maier & Neustadt, P.C.

(57) ABSTRACT

The present invention provides acidic drinks that contain a tofu puree and have improved texture and flavor, namely acidic drinks that compound, as a raw material, a tofu puree having the following physicochemical properties: a) having a viscosity of 20 to 3,000 mPa·s, b) having a dynamic storage modulus of 0.2 to 600 Pa, c) having a dynamic loss modulus of 0.2 to 250 Pa, and d) containing particles having an average particle diameter of 2 to 15 μm, and a 90% particle diameter of 35 μm or less. According to the present invention, it is possible to manufacture and provide acidic drinks of a novel type having an excellent texture and a favorable flavor, which cannot be expected with conventional products, and being free from the separation of the components during storage.

3 Claims, 1 Drawing Sheet

ACIDIC DRINKS CONTAINING TOFU PUREE

TECHNICAL FIELD

The present invention relates to acidic drinks that contain a tofu puree and have improved texture and flavor; more particularly, the present invention relates to acidic drinks containing a soybean product that are of a novel type in which a tofu puree having specific physicochemical properties is used as a raw material, and thus have an excellent texture and a favorable flavor that cannot be expected with conventional products.

In the present specification, with the exception of for the particle size distribution and the volume of separated water during storage, percentages (%) are by weight unless otherwise specified.

Moreover, in the present specification, the average particle diameter means the particle diameter corresponding to 50% in the cumulative particle size distribution, and the 90% particle diameter means the particle diameter corresponding to 90% in the cumulative particle size distribution.

BACKGROUND ART

Hitherto, various acidic drinks containing soybean products such as soy milk or tofu paste have been developed, but the product characteristics such as texture and flavor of such acidic drinks containing soybean products have varied greatly according to the type and properties of the soybean product used as a raw material.

Hitherto, various manufacturing techniques have been developed for such soybean products and acidic drinks containing these soybean products. Out of these, first, as manufacturing techniques for soybean products such as tofu paste, for example, 1) a method in which tofu is made into a paste using a silent cutter or the like and then frozen (Japanese Patent Application Laid-open No. 6-46784, hereinafter referred to as 'Prior Art 1'), 2) a method in which a coagulum obtained by adding a coagulating agent to soy milk is drained and then made into a paste using a high-speed cutter or the like (Japanese Patent Application Laid-open No. 2-86747, hereinafter referred to as 'Prior Art 2'), and 3) a method in which a coagulating agent is added to soy milk and then processing with a homogenizer is carried out to produce a homogenized paste (Japanese Patent Application Laid-open No. 59-71641, hereinafter referred to as 'Prior Art 3') have been proposed.

Next, as techniques for manufacturing acidic drinks containing soybean products such as soy milk and tofu paste, for example 4) a method of manufacturing an acidic soy milk drink in which a soy protein liquid extract obtained by adding a stabilizer and so on to a soy protein liquid extract and then adding and mixing in a fruit juice or an acidulant to the resulting solution is used as a principal raw material (Japanese Patent Application Laid-open No. 58-13358, hereinafter referred to as 'Prior Art 4'), 5) a method of manufacturing an acidic soy milk drink in which soy milk to which a high methoxyl pectin has been added is used as a raw material base (Japanese Patent Application Laid-open No. 58-183060, hereinafter referred to as 'Prior Art 5'), 6) a method of manufacturing an acidic protein drink in which tamarind seed gum polysaccharide and/or guar gum and a pectin are used together as stabilizers (Japanese Patent Application Laid-open No. 60-256372, hereinafter referred to as 'Prior Art 6'), 7) a method of manufacturing a fruit juice-containing soy milk drink in which an acidic fruit juice is added or an acidic fruit juice and an organic acid are added to soy milk that has been fermented using lactic acid bacteria (Japanese Patent Application Laid-open No. 61-141840, hereinafter referred to as 'Prior Art 7'), 8) a method of manufacturing an acidic milk drink in which a pectin and gum arabic are used together as stabilizers (Japanese Patent Application Laid-open No. 10-313781, hereinafter referred to as 'Prior Art 8'), and 9) a method of manufacturing a lactic acid-fermented soy milk characterized in that a coagulating agent is added to soy milk, the soy milk is heated and then homogenized, and then the soy milk is subjected to lactic acid fermentation (Japanese Patent Application Laid-open No. 2000-93083, hereinafter referred to as 'Prior Art 9') have been proposed.

However, in general, with a conventional tofu paste, tofu is made into a paste either as is or after having been drained (i.e. after the tofu has been completely coagulated), and hence the tofu paste obtained inevitably has the following properties: 1) a viscosity exceeding 3,000 mPa·s, 2) a dynamic storage modulus exceeding 600 Pa, 3) a dynamic loss modulus exceeding 250 Pa, 4) an average particle diameter exceeding 15 μm, and 5) a 90% particle diameter exceeding 35 μm. Consequently, there is a problem that conventional tofu pastes have a poor texture, being gritty, and acidic drinks compounding such tofu pastes have a poor texture and flavor, and moreover separation of components occurs during storage.

Moreover, with a paste obtained by adding a coagulating agent to soy milk and then homogenizing with a homogenizer, because the paste is produced using only a homogenizer, the average particle diameter exceeds 15 μm and the 90% grain diameter exceeds 35 μm, and hence there is a problem that an acidic drink compounding such a tofu paste has a poor texture and flavor.

Moreover, as mentioned above, an acidic soy milk drink obtained by adding a stabilizer to a soy protein liquid extract and then adding and mixing a fruit juice or an acidulant to the resulting solution, an acidic soy milk drink in which soy milk to which a high methoxyl pectin has been added is used as a raw material base, an acidic protein drink in which tamarind seed gum polysaccharide and/or guar gum and a pectin are used together, and so on are known; however, with such acidic protein drinks, there is a problem that, due to coagulation and precipitation of the protein under the acidic conditions, the texture and flavor thereof are poor, and separation of components occurs.

Moreover, as mentioned above, a fruit juice-containing soy milk drink obtained by adding an acidic fruit juice and an organic acid to soy milk that has been fermented using lactic acid bacteria, an acidic milk drink in which a pectin and gum arabic are used as stabilizers, and so on are known; however, with such acidic drinks, for example, in the case of a high-protein soy milk drink, there is a problem that the texture and flavor thereof become poor due to coagulation and precipitation of the protein.

As described above, various methods of manufacturing tofu paste and methods of manufacturing acidic drinks containing soybean products such as tofu paste have been proposed hitherto, but for example, there have been problems with conventional products in terms of texture and flavor in particular as described above; in the technical field in question, there have thus been strong demands for the development of a completely new type of product not having such problems.

Amid such a state of affairs and in view of the prior art described above, the present inventors carried out assiduous studies with an aim of developing novel acidic drinks according to which the problems seen with conventional products described above can be reliably resolved, and as a result discovered that when manufacturing acidic drinks containing a soybean product, by using a tofu puree having specific physicochemical properties as a raw material, acidic drinks of a novel type having an excellent texture and a favorable flavor can be manufactured, thus accomplishing the present invention.

That is, it is an object of the present invention to provide acidic drinks that contain a tofu puree having specific physicochemical properties and thus have improved texture and flavor.

Moreover, it is an object of the present invention to manufacture and provide acidic drinks having excellent product characteristics that cannot be expected with conventional products, namely a good texture and flavor, and being free from the separation of components during storage, by compounding a tofu puree having specific physicochemical properties as a raw material when manufacturing acidic drinks containing a soybean product.

DISCLOSURE OF THE INVENTION

To resolve the above problems, the present invention is constituted from the following technical means.

(1) An acidic drink that compounds a tofu puree and has improved texture and flavor, the acidic drink characterized by compounding, as a raw material, a tofu puree having the following physicochemical properties a) to d):

a) having a viscosity of 20 to 3,000 mPa·s;
b) having a dynamic storage modulus of 0.2 to 600 Pa;
c) having a dynamic loss modulus of 0.2 to 250 Pa; and
d) containing particles having an average particles diameter of 2 to 15 μm, and a 90% particle diameter of 35 μm or less.

(2) The acidic drink according to (1) above, characterized by containing 20 to 70% of the tofu puree.

(3) The acidic drink according to (1) above, characterized by having a soy protein content of 1.5 to 3.0%.

(4) The acidic drink according to any of (1) through (3) above, characterized by being one of soft drinks or drinks.

Next, the present invention will be described in more detail.

The present invention provides an acidic drink that contains a tofu puree and has improved texture and flavor, the acidic drink characterized by compounding, as a raw material, a tofu puree having specific physicochemical properties, namely a) having a viscosity of 20 to 3,000 mPa·s, b) having a dynamic storage modulus of 0.2 to 600 Pa, c) having a dynamic loss modulus of 0.2 to 250 Pa, and d) containing particles having an average particle diameter of 2 to 15 μm, and a 90% particle diameter of 35 μm or less. An acidic drink containing a tofu puree having the above-mentioned specific physicochemical properties has not been known up until now. Note that the tofu puree having the above-mentioned specific physicochemical properties can be manufactured using a method described later in the Examples.

In the present invention, examples of the acidic drinks include a soft drink, a fruit juice drink, a smoothie, a shake, a soup and so on, but there is no limitation thereto, with it being possible for the acidic drink to be any drink known as an acidic drink having a pH of 5 or less.

In the present invention, a tofu puree having the above-mentioned specific physicochemical properties is mixed into the acidic drink as a raw material, and here the content of the tofu puree in the acidic drink is preferably from 20 to 70%. Examples of components of the acidic drink of the present invention other than the tofu puree include juices or purees of fruits such as orange, strawberry and banana, saccharides such as glucose, fructose and oligosaccharides, organic acids such as citric acid, lactic acid and malic acid, oils and fats, flavorings and so on, but there is no limitation thereto, with it being possible to use any components ordinarily used in acidic drinks. These components are used as appropriate in accordance with the type of the acidic drink, and moreover there are no particular limitations on the proportions and so on of the various components.

The present invention includes all of various products such as soft drinks and drinks having such components added thereto.

Using raw materials as described above, any of various acidic drinks is manufactured, for example, through the steps of combining suitable materials such as the tofu puree, sugar, concentrated orange juice and a stabilizer, mixing uniformly, sterilizing by heating, homogenizing, and cooling.

FIG. 1 shows a schematic drawing of an example of an apparatus for manufacturing the tofu puree used in the present invention. The tofu puree manufacturing apparatus of FIG. 1 is constituted from a raw material tank 1 (made of stainless steel, made by Morinaga Engineering Co., Ltd.), heating means 3 (plate heater, made by Morinaga Engineering Co., Ltd.), a holding pipe 6 (made by Morinaga Engineering Co., Ltd.), first emulsification/dispersion means 10 (Milder, made by Ebara Corporation), cooling means 11 (plate cooler, made by Morinaga Engineering Co., Ltd.), and second emulsification/dispersion means 14 (homogenizer, made by Sanmaru Kikai Kogyo Co., Ltd.).

Moreover, coagulating agent supply means 7 (made by Morinaga Engineering Co., Ltd.) for supplying a coagulating agent is connected in between the heating means 3 and the holding pipe 6.

Moreover, in the tofu puree manufacturing apparatus of FIG. 1, piping and equipment for sterilizing the pipeline before manufacturing the tofu puree, and piping and equipment for cleaning the pipeline after manufacturing the tofu puree are provided (not shown in the drawing). Moreover, pressure gauges and thermometers for checking the pressure and liquid temperature in the piping, and equipment for automatically controlling the pressure, temperature and so on at each place are provided (not shown in the drawing).

Furthermore, piping and equipment such as piping for returning the liquid from the outlet piping to the inlet piping for each of the heating means 3, the first emulsification/dispersion means 10, the cooling means 11 and the second emulsification/dispersion means 14 in the case that the manufacturing requirements are not achieved, a mixer for uniformly mixing the raw material soy milk, bypass piping required in case of emergency or during maintenance/inspection or the like, and flow control valves required for regulating the flow rate along the pipeline are provided (not shown in the drawing).

Using this manufacturing apparatus, the tofu puree can be manufactured using a method described later in the Examples.

In the present invention, it is preferable for the acidic drink to contain from 20 to 70% of the tofu puree out of the raw materials thereof, and for the soy protein content to be from 1.5 to 3.0%, whereby an acidic drink having a good texture and flavor can be obtained.

According to the manufacturing method described above, it is possible to obtain an acidic drink having improved texture and flavor that contains a tofu puree having specific physicochemical properties, namely a) having a viscosity of 20 to 3,000 mPa·s, b) having a dynamic storage modulus of 0.2 to 600 Pa, c) having a dynamic loss modulus of 0.2 to 250 Pa, and d) containing particles having an average particle diameter of 2 to 15 μm, and a 90% particle diameter of 35 μm or less.

The acidic drink containing a tofu puree of the present invention is an acidic drink that contains a tofu puree and has an excellent texture and a favorable flavor as is clear from the Examples described later. The acidic drink containing a tofu puree of the present invention enables the problems of conventional products seen in the case of using a soybean product in an acidic drink to be resolved reliably; such an acidic drink has not been known up until now, and there has been no literature regarding such an acidic drink.

Next, the present invention will be described concretely through test examples.

In the present invention, the following test methods were used.

(1) Method of Measuring Viscosity of Samples

Each of the prepared samples was left standing for 24 hours at 10° C., and then the viscosity thereof was measured at a rotor rotational speed of 60 rpm using a B-type viscometer (DVL-BII, made by Tokimec Inc.), wherein a No. 2 or No. 4 rotor was installed.

(2) Method of Measuring Dynamic Storage Modulus and Dynamic Loss Modulus of Samples Each of the prepared samples was left standing for 24 hours at 10° C., and then the dynamic storage modulus and the dynamic loss modulus were measured at a frequency of 50.0 rad/s using an ARES viscoelasticity measurement system (made by Rheometric Scientific F.E. Ltd.).

(3) Method of Measuring Average Particle Diameter and 90% Particle Diameter of Samples Each of the prepared samples was left standing for 24 hours at 10° C., and then the average particle diameter (the particle diameter corresponding to 50% in the cumulative particle size distribution) and the 90% particle diameter (the particle diameter corresponding to 90% in the cumulative particle size distribution) were measured using a laser diffraction type particle size distribution measurement apparatus (LA-500, made by Horiba Ltd.).

(4) Test Method for Texture of Samples

Each of the samples was tested sensorily by a panel comprising 20 men and 20 women of age 20 to 40 using the following evaluation method.

Each sample was evaluated using a four-level system, with 0 being 'good texture', 1 being 'fairly good texture', 2 being 'fairly poor texture', and 3 being 'poor texture', the mean value of the evaluation score was calculated for each sample, and judgement was carried out in accordance with the following criteria: good: less than 0.5; fairly good: at least 0.5 but less than 1.5; fairly poor: at least 1.5 but less than 2.5; poor: at least 2.5 but less than 3.0.

(5) Flavor Tests

Each of the samples was tested sensorily by a panel comprising 20 men and 20 women of age 20 to 40 using the following evaluation method.

Each sample was evaluated using a four-level system, with 0 being 'good flavor', 1 being 'fairly good flavor', 2 being 'fairly poor flavor', and 3 being 'poor flavor', the mean value of the evaluation score was calculated for each sample, and judgement was carried out in accordance with the following criteria: good: less than 0.5; fairly good: at least 0.5 but less than 1.5; fairly poor: at least 1.5 but less than 2.5; poor: at least 2.5 but less than 3.0.

(6) Measurement of Separated Water

Each of the prepared acidic drinks was filled aseptically into a transparent glass vessel, and was left standing for 7 days at room temperature, and then the volume of separated water was checked, and the acidic drinks were evaluated in accordance with the following criteria: separates: separated water at least 5% of whole; separates somewhat: separated water from 1 to 4%; no separation: separated water from 0 to 1%.

TEST EXAMPLES 1

These tests were carried out to compare orange drinks obtained using prior art with an orange drink of the present invention.

(1) Preparation of Test Samples

The following 11 samples were prepared.

1) Sample 1

A tofu puree having specific physicochemical properties was used as a raw material. Specifically, an orange drink of the present invention containing a tofu puree manufactured using the same method as in Example 1 was taken as Sample 1.

2) Sample 2

Taken as Sample 2 was an orange drink that was manufactured using the same method as in Example 1 of the present invention described later, except that instead of the tofu puree there was used a tofu paste obtained by processing momen-dofu (firm tofu) manufactured using the same method as in Reference Example 2 into a paste using a silent cutter in accordance with the method of Example 1 in Prior Art 1.

3) Sample 3

Taken as Sample 3 was an orange drink that was manufactured using the same method as in Example 1 of the present invention, except that instead of the tofu puree there was used a paste obtained by adding glucono-delta-lactone as a coagulating agent to soy milk that had been manufactured using the same method as in Reference Example 1, and then dehydrating the coagulum and then processing into a paste using a high-speed cutter, this being in accordance with the method of Example 1 in Prior Art 2.

4) Sample 4

Taken as Sample 4 was an orange drink that was manufactured using the same method as in Example 1 of the present invention, except that instead of the tofu puree there was used a paste obtained by adding a coagulating agent to soy milk that had been manufactured using the same method as in Reference Example 1, mixing uniformly, and holding at 80° C. for 5 seconds to manufacture a coagulum, and then processing the coagulum with a homogenizer, this being in accordance with the method of Example 1 in Prior Art 3.

5) Sample 5

Taken as Sample 5 was an orange drink that was manufactured using the same method as in Example 1 of the present invention, except that instead of the tofu puree there was used a paste obtained by adding, to soy milk that had been manufactured using the same method as in Reference Example 1, magnesium chloride as a coagulating agent in a proportion of 4% relative to the solid content of the soy milk as in Example 1 of the present invention, mixing uniformly, and holding at 80° C. for 5 seconds to manufacture a coagulum, and then processing the coagulum with a homogenizer, this being in accordance with the method of Example 1 in Prior Art 3.

6) Sample 6

Taken as Sample 6 was an orange drink that was manufactured using the same method as in Example 1 of the present invention using sugar as a saccharide and a high methoxyl pectin as a stabilizer, except that instead of the tofu puree there was used a material obtained by adding with mixing, to soy milk that had been manufactured using the same method as in Reference Example 1, a calcium lactate solution such that the calcium ion content was 100 mg %, this being in accordance with the disclosures in Prior Art 4.

7) Sample 7

Taken as Sample 7 was an orange drink that was manufactured using the same method as in Example 1 of the present invention, except that instead of the tofu puree there was used soy milk that had been manufactured using the same method as in Reference Example 1, this being in accordance with the disclosures in Prior Art 5.

8) Sample 8

Taken as Sample 8 was an orange drink that was manufactured using the same method as in Example 1 of the present invention, except that instead of the tofu puree, soy milk that had been manufactured using the same method as in Reference Example 1 was used, and as a stabilizer, in addition to the high methoxyl pectin, tamarind gum polysaccharide was added with mixing such that the content thereof was 0.1%, this being in accordance with the disclosures in Prior Art 6.

9) Sample 9

Taken as Sample 9 was an orange drink that was manufactured using the same method as in Example 1 of the present invention, except that instead of the tofu puree there was used fermented soy milk obtained by inoculating soy milk that had been manufactured using the same method as in Reference Example 1 with *Streptococcus thermophilus* and *Lactobacillus bulgaricus* and fermenting for 12 hours at 40° C., this being in accordance with the disclosures in Prior Art 7.

10) Sample 10

Taken as Sample 10 was an orange drink that was manufactured using the same method as in Example 1 of the present invention, except that instead of the tofu puree there was used fermented milk obtained by adding 3% of commercially sold plain yogurt to soy milk that had been manufactured using the same method as in Reference Example 1 and fermenting with lactic acid bacteria at 45° C. until the pH was 4.2, this being in accordance with the disclosures in the Examples in Prior Art 8, and a high methoxyl pectin and gum arabic were used together as stabilizers, this being in accordance with the method of Example 1 in Prior Art 8.

11) Sample 11

Taken as Sample 11 was an orange drink that was manufactured using the same method as in Example 1 of the present invention, except that instead of the tofu puree there was used a lactic acid-fermented soy milk that was obtained by heating soy milk that had been manufactured using the same method as in Reference Example 1 to 80° C., adding with mixing 0.35% of magnesium chloride, holding as is at 80° C. for 5 minutes, cooling to 70° C. and carrying out homogenization using a homogenizer at 100 kg/cm$^2$, and then inoculating with *Streptococcus thermophilus* and *Lactobacillus bulgaricus* and fermenting for 7 hours at 40° C., this being in accordance with the disclosures in Prior Art 9.

(2) Test Methods

Measurement was carried out of the texture and flavor, and separated water, for each of the samples, using the test methods described earlier.

(3) Test Results

The test results are shown in Table 1. As is clear from Table 1, it was ascertained that compared with Samples 2 to 11 according to the prior art, the texture is better, i.e. the product characteristic is superior, for Sample 1 according to the present invention.

Moreover, it was ascertained that compared with the samples according to the prior art, particularly Samples 6, 7, 9 and 10, the flavor is better, i.e. the product characteristic is superior, for Sample 1 according to the present invention.

Moreover, it was ascertained that there is no separated water, i.e. the product characteristic is superior, for Sample 1 according to the present invention.

Note that upon changing the type of the soy milk or tofu as deemed appropriate and similarly carrying out tests, similar results were obtained.

TABLE 1

| Sample Number | Texture | Flavor | Separation during storage |
|---|---|---|---|
| 1 | Good | Good | No separation |
| 2 | Poor | Fairly poor | Separation |
| 3 | Poor | Fairly poor | Separation |
| 4 | Poor | Fairly poor | Separation |
| 5 | Poor | Fairly poor | Separation |
| 6 | Poor | Poor | Separation |
| 7 | Fairly poor | Poor | Separation somewhat |
| 8 | Poor | Fairly poor | Separation |
| 9 | Poor | Poor | Separation |
| 10 | Poor | Poor | Separation somewhat |
| 11 | Poor | Fairly poor | Separation somewhat |

TEST EXAMPLES 2

Taking the texture and flavor of an acidic drink containing a tofu puree as indicators, these tests were carried out to investigate what physicochemical properties are required of the tofu puree to manufacture an acidic drink that is excellent in terms of texture and flavor.

(1) Preparation of Test Samples

Five tofu puree samples were prepared using the same method as in Example 1, except that the homogenizer processing pressure was adjusted, thus changing the physicochemical properties, namely the viscosity, the dynamic storage modulus, and the dynamic loss modulus, of the tofu puree; using each of the tofu puree samples, five acidic drink samples were then prepared using the same method as in Example 1.

(2) Test Methods

The viscosity, the dynamic storage modulus, the dynamic loss modulus, the average particle diameter and the 90% particle diameter of each of the tofu puree samples, and the texture and the flavor of each of the acidic drink samples, were measured using the test methods described earlier.

(3) Test Results

The test results are shown in Table 2. As is clear from Table 2, it was ascertained that to manufacture an acidic drink that is excellent in terms of texture and flavor, it is necessary for the tofu puree used to have specific physico-chemical properties, namely to contain particles having an average particle diameter of 2 to 15 μm and a 90% particle diameter of 35 μm or less, to have a viscosity of 20 to 3,000 mPa·s, to have a dynamic storage modulus of 0.2 to 600 Pa, and to have a dynamic loss modulus of 0.2 to 250 Pa.

Note that upon changing the type of the soy milk, the type of the coagulating agent, or the emulsification/dispersion means as deemed appropriate and similarly carrying out tests, similar results were obtained.

TABLE 2

| Viscosity | Dynamic storage modulus | Dynamic loss modulus | Average particle diameter | 90% particle diameter | Texture | Flavor |
|---|---|---|---|---|---|---|
| 10 | 0.1 | 0.1 | 1.0 | 10.2 | Poor | Good |
| 20 | 0.2 | 0.2 | 2.0 | 15.3 | Good | Good |
| 1100 | 14.5 | 8.7 | 13.4 | 23.1 | Good | Good |
| 3000 | 600.0 | 250.0 | 15.0 | 35.0 | Good | Good |
| 4000 | 647.5 | 258.6 | 21.2 | 38.5 | Poor | Poor |

TEST EXAMPLES 3

Taking the texture and flavor of an acidic drink containing a tofu puree as indicators, these tests were carried out to investigate what soy protein content is suitable for an acidic drink that is excellent in terms of texture and flavor.

(1) Preparation of Test Samples

Four acidic drink samples were prepared using the same method as in Example 1, except that the tofu puree content was adjusted, thus changing the soy protein content in the acidic drink.

(2) Test Methods

Measurement was carried out of the texture and flavor, and separated water, for each of the acidic drink samples, using the test methods described earlier.

(3) Test Results

The test results are shown in Table 3. As is clear from Table 3, it was ascertained that to manufacture an acidic drink that is excellent in terms of texture and flavor, and separated water, it is necessary for the soy protein content in the acidic drink to be 1.5 to 3.0%.

Note that upon changing the type of the soy milk, the type of the coagulating agent, or the emulsification/dispersion means as deemed appropriate and similarly carrying out tests, similar results were obtained.

TABLE 3

| Soy protein content | Texture | Falvor | Separation during storage |
|---|---|---|---|
| 1.0 | Fairly poor | Good | Separation somewhat |
| 1.5 | Good | Good | No separation |
| 3.0 | Good | Good | No separation |
| 4.0 | Fairly poor | Fairly poor | No separation |

REFERENCE EXAMPLE 1

(Example of Manufacture of Soy Milk)

60 kg of soybeans produced in the USA (IOM; imported by Mitsui & Co., Ltd.) were washed, and were soaked under running water for 12 hours to make the soybeans swell, and then the soaked soybeans and 170 kg of water were fed into a grinder (made by Nagasawa Kikai Seisakusho Co., Ltd.) and were ground to prepare approximately 220 kg of raw soybean slurry. This approximately 220 kg of raw soybean slurry was cooked for 4 minutes at 100° C. using a continuous type cooker (made by Nagasawa Kikai Seisakusho Co., Ltd.), and was separated into soy milk and refuse using a press (made by Arai Machinery Corp.) to manufacture approximately 190 kg of soy milk. The soy milk obtained had a solid content of approximately 13%.

REFERENCE EXAMPLE 2

(Example of Manufacture of Tofu)

60 kg of the same soybeans produced in the USA as in Reference Example 1 above were soaked, and then the soaked soybeans and 570 kg of water were fed into a grinder and were ground to prepare approximately 620 kg of raw soybean slurry. This approximately 620 kg of raw soybean slurry was cooked for 4 minutes at 100° C. using a continuous type cooker, and was separated into soy milk and refuse using a press to manufacture approximately 600 kg of soy milk. The soy milk obtained had a solid content of approximately 4.5%.

100 kg of the above-mentioned soy milk was cooled to 70 to 75° C., and then calcium sulfate (made by Tomita Pharmaceutical Co., Ltd.) suspended in tepid water was added thereto with mixing to a concentration of 7.8% relative to the solid content of the soy milk, and the mixture was left for 10 minutes. The coagulum thus obtained was lightly broken up, and was then transferred into a mold box, and was pressed for 20 minutes to manufacture approximately 80 kg of tofu. The tofu was taken out, exposed to water and thus cooled, and then cut up. The momen-dofu (firm tofu) thus obtained had a water content of approximately 87%.

EXPLANATION OF REFERENCE NUMERALS

Figure 1:
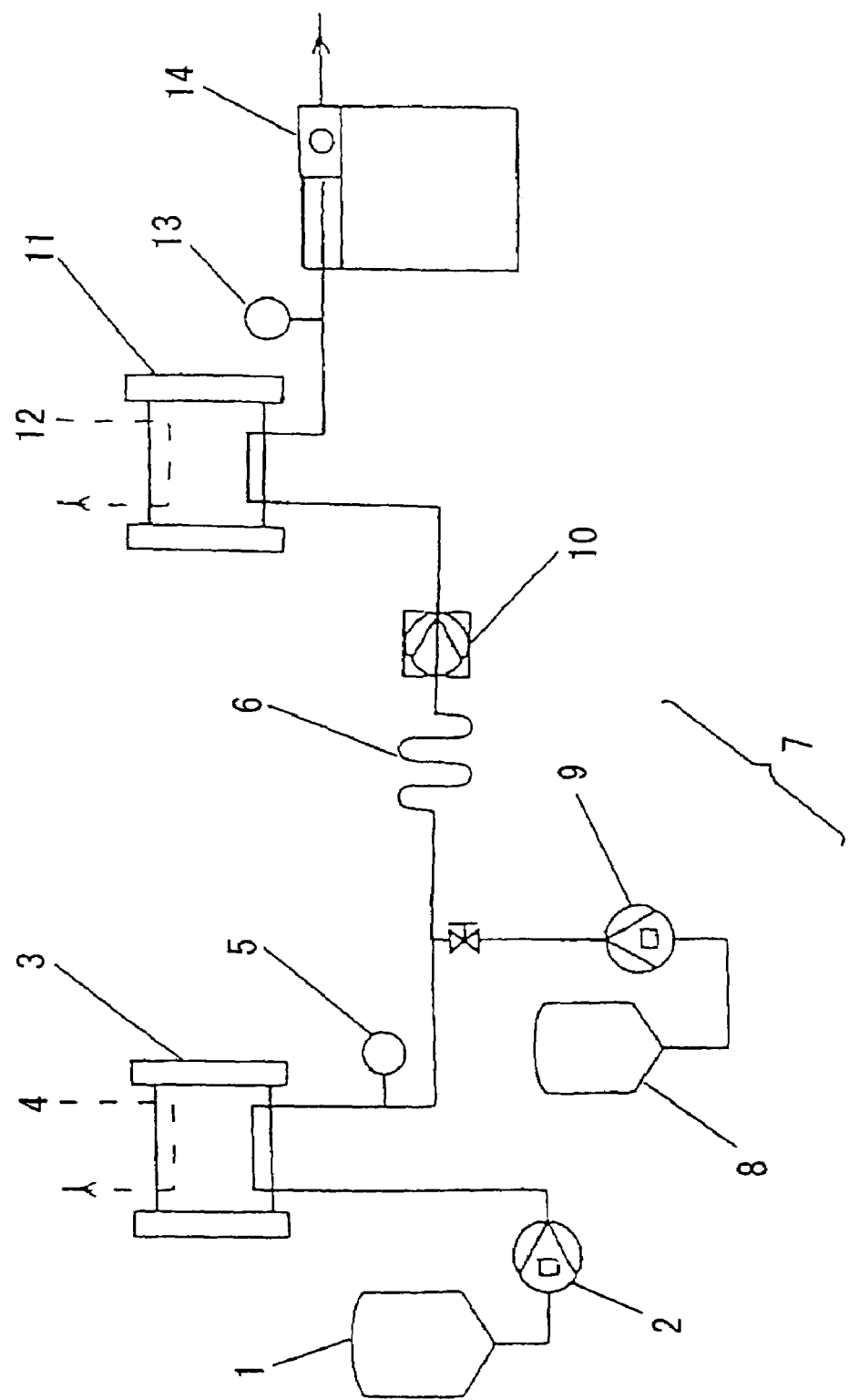
FIG. 1 shows a schematic drawing of an example of an apparatus for manufacturing tofu puree used in the present invention.

1 Raw material tank
2 Metering pump
3 Heating means (plate heater)
4 Heat source
5 Temperature controller
6 Holding pipe
7 Coagulating agent supply means
8 Coagulating agent tank 9 Metering pump
10 First emulsification/dispersion means (Milder)
11 Cooling means (plate cooler)
12 Coolant
13 Temperature controller
14 Second emulsification/dispersion means (homogenizer)

BEST MODE FOR CARRYING OUT THE INVENTION

Next, the present invention will be described concretely through Examples; however, the present invention is not limited whatsoever by the following Examples.

EXAMPLE 1

1) Preparation of Tofu Puree

A tofu puree used in the present invention was manufactured using the tofu puree manufacturing apparatus shown in FIG. 1.

Specifically, 100 kg of soy milk having a solid content of 13% and a temperature of 10° C. that had been manufactured using the same method as in Reference Example 1 and had been stored in the raw material tank 1 was fed to the heating means 3 by a metering pump 2 (made by Nakakin Co., Ltd.) having a flow control valve, and the soy milk that had flowed into the heating means 3 was heated to 60° C. by a heat source 4, namely hot water, the temperature of which was controlled by a temperature controller 5 (made by Yokogawa Electric Corporation), and then fed into the holding pipe 6 at 28 ml/sec.

A coagulating agent [magnesium chloride (made by Nichia Chemical Industries, Ltd.)] that had been stored in a coagulating agent tank 8 (made by Morinaga Engineering Co., Ltd.) of the coagulating agent supply means 7 was supplied into the soy milk fed in from the heating means 3 by a metering pump 9 (made by FMI) having a flow control valve at 0.4 ml/s so as to be added in a rate of 4% relative to the solid content of the soy milk, and mixed uniformly, and then the mixture was held for 3 seconds at 60° C. in the holding pipe 6 to produce a coagulum, and the coagulum was fed to the first emulsification/dispersion means 10 (Milder, made by Ebara Corporation).

The soy milk coagulum that had flowed into the first emulsification/dispersion means 10 (Milder, made by Ebara Corporation) was immediately subjected to preliminary crushing to an average particle diameter of 20 μm with a Milder rotational speed of 12,000 rpm, and was then fed to the cooling means 11. The material that had been subjected to the preliminary crushing and fed to the cooling means 11 was cooled by a coolant 12, namely cold water, the temperature of which was controlled to 30° C. by a temperature controller 13 (made by Yokogawa Electric Corporation), and fed to the second emulsification/dispersion means 14 (homogenizer, made by Sanmaru Kikai Kogyo).

The material that had been subjected to the preliminary crushing and fed to the second emulsification/dispersion means 14 (homogenizer, made by Sanmaru Kikai Kogyo) was then crushed to an average particle diameter of 13.4 μm and a 90% particle diameter of 23.1 μm with a processing pressure of 12 MPa.

The tofu puree thus obtained had a viscosity of 1,100 mPa·s, a dynamic storage modulus of 14.5 Pa, and a dynamic loss modulus of 8.7 Pa, and contained particles having an average particle diameter of 13.4 μm and a 90% particle diameter of 23.1 μm; the tofu puree was a product having an excellent texture, with there being no powdery mouth-feel, and a good flavor.

2) Preparation of Orange Drink Containing the Tofu Puree 3.45 kg of dissolved water, 0.9 kg of sugar, 0.05 kg of a high methoxyl pectin (made by San-Ei Gen F.F.I., Inc.), and 0.1 kg of gum arabic (made by San-Ei Gen F.F.I., Inc.) were added to 5 kg of the tofu puree prepared in 1) above, and the materials were agitated under conditions of 6000 rpm for 2 minutes using a homomixer (made by Tokushu Kikakogyo Co., Ltd.) to disperse them. 0.5 kg of concentrated orange juice (made by Cargill) was then further added thereto, and these were dispersed and dissolved once again using a homomixer. The resulting mixture was sterilized by heating for 30 minutes at 85° C., and was then homogenized at a processing pressure of 20 MPa using a homogenizer (made by Sanmaru Kikai Kogyo), and then cooled to 20° C., thus obtaining an orange drink.

This product was tested in accordance with the texture and flavor test methods described earlier, and the results were that the product had an excellent texture and a favorable flavor.

EXAMPLE 2

1) Preparation of Tofu Puree

A tofu puree was manufactured using the same tofu puree manufacturing apparatus as in Example 1 described above but with some of the manufacturing conditions changed.

Specifically, 100 kg of soy milk having a solid content of 13% and a temperature of 10° C. that had been manufactured using the same method as in Reference Example 1 and had been housed in the raw material tank 1 was fed to the heating means 3, and was heated to 80° C. by the heating means 3; a coagulating agent [magnesium chloride (made by Nichia Chemical Industries, Ltd.)] was then added to the soy milk using the coagulating agent supply means 7 in a rate of 4% relative to the solid content of the soy milk, and mixed uniformly, and the mixture was held for 3 seconds at 80° C. in the holding pipe 6, thus producing a coagulum.

This soy milk coagulum was immediately subjected to preliminary crushing to an average particle diameter of 10 μm using the first emulsification/dispersion means 10 with a Milder rotational speed of 12,000 rpm, and was then fed to the cooling means 11, and cooled to 30° C. by the cooling means 11.

The material that had been subjected to the preliminary crushing was then immediately crushed to an average particle diameter of 4.8 μm and a 90% particle diameter of 8.0 μm using the second emulsification/dispersion means 14 with a processing pressure of 3 MPa.

The tofu puree thus obtained had a viscosity of 233 mPa·s, a dynamic storage modulus of 1.5 Pa, and a dynamic loss modulus of 1.1 Pa, and contained particles having an average particle diameter of 4.8 μm and a 90% particle diameter of 8.0 μm; as with the tofu puree obtained in Example 1, this tofu puree was a product having an excellent texture, with there being no powdery mouth-feel, and a good flavor.

2) Preparation of Strawberry Drink Containing the Tofu Puree 2.38 kg of dissolved water, 1.1 kg of sugar, 0.07 kg of a high methoxyl pectin (made by San-Ei Gen F.F.I., Inc.), and 0.03 kg of citric acid (made by San-Ei Gen F.F.I., Inc.) were added to 6 kg of the tofu puree prepared in 1) above, and these materials were agitated under conditions of 6000 rpm for 2 minutes using a homomixer (made by Tokushu Kikakogyo Co., Ltd.) to disperse them. 0.4 kg of concentrated strawberry juice (made by Taiyo Kagaku Co., Ltd.), 0.01 kg of strawberry flavoring (made by T. Hasegawa Co., Ltd.), and 0.01 kg of purple sweet potato coloring (made by San-Ei Gen F.F.I., Inc.) were then further added thereto, and the mixture was Dispersed and dissolved once again using a homomixer. The resulting mixture was sterilized by heating for 20 minutes at 90° C., and was then homogenized at a processing pressure of 10 MPa using a homogenizer (made by Sanmaru Kikai Kogyo), and then cooled to 20° C., thus obtaining a strawberry drink.

This product was tested in accordance with the texture and flavor test methods described earlier, and the results were that the product had an excellent texture and a favorable flavor.

EXAMPLE 3

1) Preparation of Tofu Puree

A tofu puree was manufactured using the same tofu puree manufacturing apparatus as in Example 1 described above but with some of the manufacturing conditions changed.

Specifically, 100 kg of soy milk having a solid content of 10% and a temperature of 10° C. that had been manufactured using virtually the same method as in Reference Example 1 and had been housed in the raw material tank 1 was fed to the heating means 3, and was heated to 85° C. by the heating means 3; a coagulating agent [calcium chloride (made by Tomita Pharmaceutical Co., Ltd.)] was then added to the soy milk using the coagulating agent supply means 7 in a rate of 3% relative to the solid content of the soy milk, and mixed uniformly, and the mixture was held for 5 seconds at 85° C. in the holding pipe 6, thus producing a coagulum.

This soy milk coagulum was immediately subjected to preliminary crushing to an average particle diameter of 14 μm using the first emulsification/dispersion means 10 with a Milder rotational speed of 12,000 rpm, and was then fed to the cooling means 11, and cooled to 30° C. by the cooling means 11.

The material that had been subjected to the preliminary crushing was then immediately crushed to an average particle diameter of 4.2 μm and a 90% particle diameter of 6.8 μm using the second emulsification/dispersion means 14 with a processing pressure of 12 MPa.

The tofu puree thus obtained had a viscosity of 74 mPa·s, a dynamic storage modulus of 1.0 Pa, and a dynamic loss modulus of 0.9 Pa, and contained particles having an average particle diameter of 4.2 μm and a 90% particle diameter of 6.8 μm; as with the tofu puree obtained in Example 1, this tofu puree was a product having an excellent texture, with there being no powdery mouth-feel, and a good flavor.

2) Preparation of Orange Drink Containing the Tofu Puree 5.34 kg of dissolved water, 0.9 kg of sugar, and 0.05 kg of a high methoxyl pectin (made by San-Ei Gen F.F.I., Inc.) were added to 3 kg of the tofu puree prepared in 1) above, and these materials were agitated under conditions of 6000 rpm for 2 minutes using a homomixer (made by Tokushu Kikakogyo Co., Ltd.) to disperse them. 0.6 kg of concentrated orange juice (made by Cargill) and 0.01 kg of orange flavoring (made by Takasago International Corporation) were then further added thereto, and the mixture was dispersed and dissolved once again using a homomixer. The resulting mixture was sterilized by heating for 30 minutes at 85° C., and was then homogenized at a processing pressure of 20 MPa using a homogenizer (made by Sanmaru Kikai Kogyo), and then cooled to 20° C., thus obtaining an orange drink.

This product was tested in accordance with the texture and flavor test methods described earlier, and the results were that the product had an excellent texture and a favorable flavor.

INDUSTRIAL APPLICABILITY

As described in detail above, the present invention relates to acidic drinks that contain a tofu puree, and according to the present invention, effects such as the following are realized.

(1) By compounding a tofu puree having specific physicochemical properties as a raw material, it is possible to manufacture and provide acidic drinks having improved texture and flavor.

(2) As acidic drinks containing a soybean product, it is possible to provide acidic drinks having an excellent texture and a favorable flavor that cannot be expected with conventional products.

(3) It is possible to provide acidic drinks that have a soy protein content of 1.5 to 3.0%, and have a good texture and flavor.

(4) It is possible to provide acidic drinks of a novel type according to which the problems of conventional products seen in the case of using a soybean product in an acidic drink have been reliably resolved.

The invention claimed is:

1. An acidic drink containing 20 to 70% tofu puree, having improved texture and flavor, and being free from the separation of components during storage, the acidic drink characterized by compounding, as a raw material, a tofu puree having the following physicochemical properties a) to d):
   a) having a viscosity of 20 to 3,000 mPa·s;
   b) having a dynamic storage modulus of 0.2 to 600 Pa;
   c) having a dynamic loss modulus of 0.2 to 250 Pa; and
   d) containing particles having an average particle diameter of 2 to 15 μm, and a 90% particle diameter of 35 μm or less.

2. The acidic drink according to claim 1, wherein the acidic drink has a soy protein content of 1.5 to 3.0%.

3. The acidic drink according to any one of claims 1 through 2, wherein the acidic drink is one of a soft drink, a fruit juice drink, a smoothie, a shake, or a soup.

* * * * *